(12) United States Patent
Hiller et al.

(10) Patent No.: US 8,873,258 B2
(45) Date of Patent: Oct. 28, 2014

(54) METHOD FOR INHIBITING A CONVERTER WITH DISTRIBUTED ENERGY STORES

(75) Inventors: Marc Hiller, Lauf An der Pegnitz (DE); Dietmar Krug, Nürnberg (DE); Rainer Sommer, Heroldsbach (DE)

(73) Assignee: Siemens Aktiengesellschaft, München (DE)

( * ) Notice: Subject to any disclaimer, the term of this patent is extended or adjusted under 35 U.S.C. 154(b) by 347 days.

(21) Appl. No.: 13/160,060

(22) Filed: Jun. 14, 2011

(65) Prior Publication Data

US 2012/0147636 A1 Jun. 14, 2012

(30) Foreign Application Priority Data

Jun. 15, 2010 (DE) .......................... 10 2010 030 078

(51) Int. Cl.
*H02H 7/122* (2006.01)
*H02M 7/483* (2007.01)

(52) U.S. Cl.
CPC .................... *H02M 7/483* (2013.01)
USPC ...................................................... 363/56.04

(58) Field of Classification Search
USPC ................................ 363/41, 55, 56.01–56.05
See application file for complete search history.

(56) References Cited

U.S. PATENT DOCUMENTS

| | | | | |
|---|---|---|---|---|
| 4,819,157 | A * | 4/1989 | Hirose et al. ............... | 363/56.03 |
| 5,214,575 | A * | 5/1993 | Sugishima et al. .............. | 363/37 |
| 5,450,306 | A * | 9/1995 | Garces et al. .................... | 363/41 |
| 5,815,391 | A * | 9/1998 | Pelly ............................... | 363/98 |
| 5,874,818 | A * | 2/1999 | Schuurman .............. | 318/400.04 |
| 6,545,452 | B2 * | 4/2003 | Bruckmann et al. ........... | 323/289 |
| 7,110,272 | B2 * | 9/2006 | Nojima ....................... | 363/56.03 |
| 7,626,838 | B2 * | 12/2009 | Gunji ......................... | 363/56.04 |
| 7,924,585 | B2 * | 4/2011 | Sommer .......................... | 363/99 |
| 8,138,632 | B2 * | 3/2012 | Sommer et al. ................. | 307/87 |
| 8,605,461 | B2 * | 12/2013 | Hibino ............................ | 363/17 |
| 2008/0232145 | A1 * | 9/2008 | Hiller et al. .............. | 363/56.01 |
| 2008/0259661 | A1 * | 10/2008 | Hiller et al. ..................... | 363/71 |
| 2011/0002149 | A1 * | 1/2011 | Hiller et al. ................... | 363/126 |
| 2011/0134666 | A1 * | 6/2011 | Hiller et al. ..................... | 363/55 |
| 2011/0134667 | A1 * | 6/2011 | Hiller et al. ..................... | 363/55 |

FOREIGN PATENT DOCUMENTS

| | | |
|---|---|---|
| DE | 101 03 031 A1 | 7/2002 |
| DE | 10 2004 043 877 A1 | 3/2006 |
| JP | 55033313 A | 3/1980 |

* cited by examiner

*Primary Examiner* — Adolf Berhane
*Assistant Examiner* — Henry Lee, III
(74) *Attorney, Agent, or Firm* — Henry M. Feiereisen LLC

(57) ABSTRACT

A method for inhibiting a converter having at least two phase modules is disclosed. Each phase module has an upper and a lower valve branch, with each upper and lower valve branch having a plurality of two-pole submodules which are electrically connected in series and each have a unipolar energy storage capacitor, with a series connection of two turn-off semiconductor switches each being connected in parallel with an antiparallel connected diode. With the method, the submodules in an upper and a lower valve branch in each phase module in the converter are controlled to a switching state III, staggered in time. This considerably reduces the voltage load for the converter and a connected polyphase motor, or a connected power supply system.

5 Claims, 4 Drawing Sheets

$S_Z = I$
$U_{X2X1} = U_{SM, x}$ $S_Z = II$
$U_{X2X1} = 0$ $S_Z = III$
$U_{X2X1} = f(i_{ZP/N})$

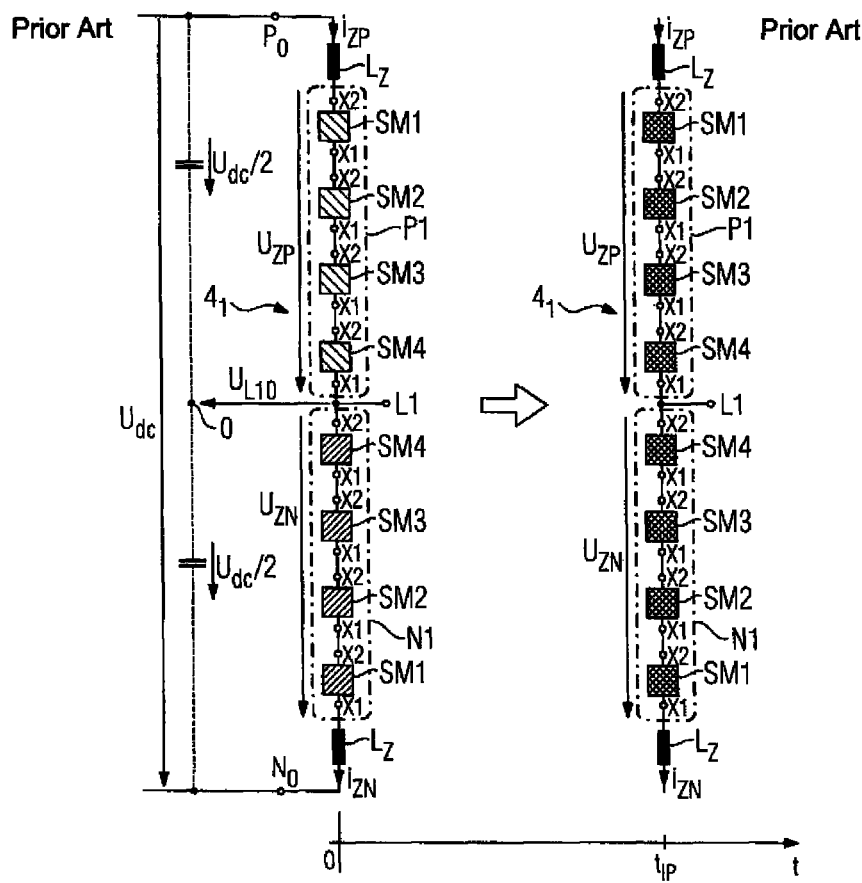

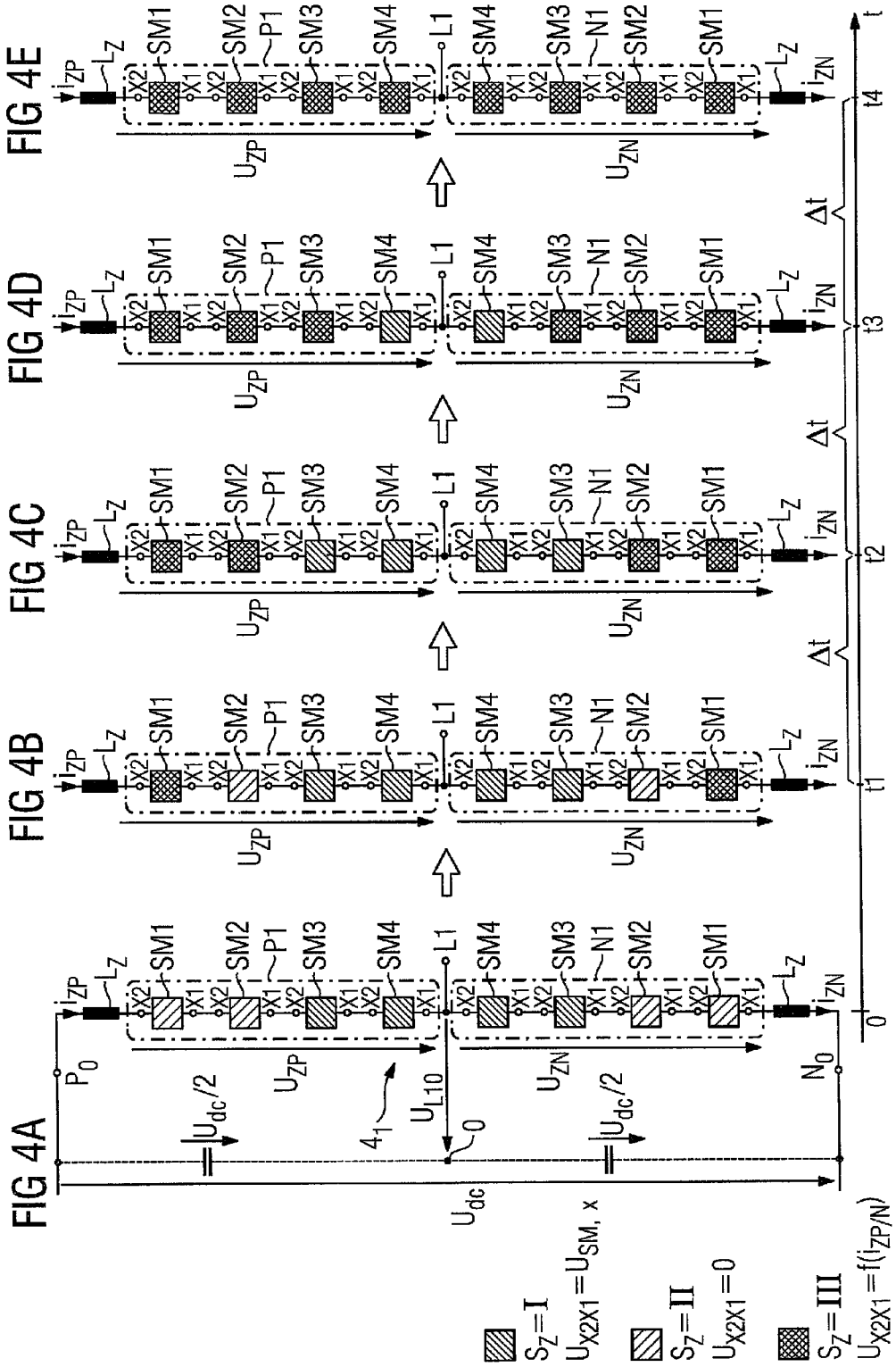

METHOD FOR INHIBITING A CONVERTER WITH DISTRIBUTED ENERGY STORES

CROSS-REFERENCES TO RELATED APPLICATIONS

This application claims the priority of German Patent Application, Serial No. 10 2010 030 078.0, filed Jun. 15, 2010, pursuant to 35 U.S.C. 119(a)-(d), the content of which is incorporated herein by reference in its entirety as if fully set forth herein.

BACKGROUND OF THE INVENTION

The present invention relates to a relates to a method for inhibiting a converter with distributed energy stores having at least two phase modules, which each have an upper and a lower valve branch, which each have a multiplicity of two-pole submodules, which are electrically connected in series and each have a unipolar energy storage capacitor, with which a series circuit of two semiconductor switches which can be turned off, each with a diode connected back-to-back in parallel, is connected electrically in parallel.

The following discussion of related art is provided to assist the reader in understanding the advantages of the invention, and is not to be construed as an admission that this related art is prior art to this invention.

A conventional converter with distributed energy stores is illustrated schematically in FIG. 1. According to FIG. 1, this converter 2 has three phase modules $4_1$, $4_2$ and $4_3$, which each have an upper and a lower respective valve branch P1 and N1, P2 and N2 as well as P3 and N3. These two valve branches P1, N1; P2, N2 and P3, N3 in each phase module $4_1$, $4_2$ and $4_3$, respectively, are connected to form one bridge arm. A junction point between an upper and a lower valve branch P1 and N1, P2 and N2 as well as P3 and N3 is passed out as a respective connection L1, L2 or L3, respectively, on the AC voltage side of the respective phase module $4_1$, $4_2$ or $4_3$. A polyphase motor 6 or a power supply system is connected to these connections L1, L2 or L3 on the AC side. The phase modules $4_1$, $4_2$ and $4_3$ are electrically connected in parallel with one another and are connected to form a DC voltage feed device, which is not illustrated in any more detail but is connected to the DC voltage connections $P_0$ and $N_0$ of the converter 2 with distributed energy stores $C_{SM}$. A generated DC voltage $U_{dc}$ is present between these DC voltage connections $P_0$ and $N_0$.

This illustration of the converter 2 with distributed energy stores $C_{SM}$ likewise shows that each valve branch P1, N1, P2, N2, P3 and N3 has a multiplicity of two-pole submodules SM1, SM2, . . . , SMn, which are electrically connected in series. Each two-pole submodule SM1, SM2, . . . , SMn, based on the illustration of the submodule SM1, has a unipolar energy storage capacitor $C_{SM}$, two semiconductor switches S1 and S2 which can be turned off, and two diodes D1 and D2. The two semiconductor switches S1 and S2 which can be turned off are electrically connected in series, and this series circuit is electrically connected in parallel with the unipolar energy storage capacitor $C_{SM}$. A respective diode D1 or D2 is connected back-to-back in parallel with the semiconductor switches S1 and S2 which can be turned off. These diodes D1 and D2 therefore each form a freewheeling diode. A junction point between the two semiconductor switches S1 and S2 which can be turned off is passed out as the module connection X2. The negative connection of the unipolar energy storage capacitor $C_{SM}$ forms a second module connection X1.

When the unipolar energy storage capacitor $C_{SM}$ has been charged, a capacitor voltage $U_{SM}$ is dropped across it.

These capacitor voltages $U_{SM1}$, $U_{SM2}$, $U_{SMn}$ of the two-pole submodules SM1, SM2, . . . , SMn in each valve branch P1, N1, P2, N2, P3 and N3 are respectively added to form a valve voltage $U_{ZP1}$, $U_{ZN1}$, $U_{ZP2}$, $U_{ZN2}$, $U_{ZP3}$ and $U_{ZN3}$. The addition of in each case two valve voltages $U_{ZP1}$, $U_{ZN1}$ as well as $U_{ZP2}$ and $U_{ZN2}$ as well as $U_{ZP3}$ and $U_{ZN3}$ of a respective phase module $4_1$, $4_2$ or $4_3$ results in the DC voltage $U_{dc}$ which is present between the DC voltage connections $P_0$ and $N_0$.

The configuration of each two-pole submodule SM in the converter 2 with distributed energy stores $C_{SM}$ allows each submodule SM each to be controlled to three switching states, specifically the switching states I, II and III. In the switching state I, the semiconductor switch S1 which can be turned off is in the ON-state, and the semiconductor switch S2 which can be turned off is in the OFF-state. The capacitor voltage $U_{SM}$ is therefore present as the terminal voltage $U_{X2X1}$ at the module connections X2 and X1 of the submodule SM, independently of the direction of a branch current $i_Z$ flowing. In the switching state II, the semiconductor switch S1 which can be turned off is in the OFF-state, and the semiconductor switch S2 which can be turned off is in the ON-state, thus resulting in a terminal voltage $U_{X2X1}$ with the amplitude zero being present at the module connections X2 and X1 of the submodule SM, likewise independently of the direction of a branch current $i_Z$ flowing. In the switching state III both semiconductor switches S1 and S2 which can be turned off are in the OFF-state. The amplitude of the terminal voltage $U_{X2X1}$ of each submodule SM when in the switching state III is dependent on the direction of a branch current $i_Z$ flowing. If the branch current is greater than zero, then the amplitude of the terminal voltage $U_{X2X1}$ of the submodule SM corresponds to the amplitude of the capacitor voltage $U_{SM}$ in this submodule SM. In contrast, if the branch current is less than zero, the amplitude of the terminal voltage is equal to zero. If no branch current $i_Z$ is flowing and if the voltage split between the semiconductor switches S1 and S2 which can be turned off in the submodule SM is symmetrical, the amplitude of the terminal voltage $U_{X2X1}$ corresponds to half the amplitude of the capacitor voltage $U_{SM}$ in the submodule SM.

In the conventional converter 2 with distributed energy stores $C_{SM}$, only the switching states I and II of the submodules SM are used during normal operation of this converter 2. The switching state III is used only in the event of defects, for example a short at its DC voltage connections $P_0$ and $N_0$, for a deliberate open circuit (interruption of converter operation) and for negligibly short switching delay times for the semiconductor switches S1 and S2 which can be turned off in a submodule SM, when a switching state change occurs.

It is known that a so-called pulse inhibitor can be activated, in order to turn the converter off in critical operating states, for example overcurrent, overvoltage, failure of a drive, failure of a control system, failure of communications between the converter valve and the modulator, . . . , such that this converter is in a safe state after operation of the pulse inhibitor. This pulse inhibitor can be implemented by inhibiting all the converter valves in the self-commutated converter (inverter). This is preferably done by interruption of the supply voltage, which is derived from an external voltage, for the optocouplers in the associated drive circuits.

When a pulse inhibitor in a converter 2 with distributed energy stores $C_{SM}$ is triggered, then all the drive signals for the semiconductor switches S1 and S2 which can be turned off in all the submodules SM1, SM2, . . . , SMn in all the valve branches P1, N1, P2, N2, P3 and N3 in the phase modules $4_1$, $4_2$ and $4_3$ in the converter 2 with distributed energy stores $C_{SM}$ must be inhibited at the same time, as shown in FIG. 1.

FIG. 2a shows for sake of clarity in more detail only the phase module $4_1$ of the converter 2 with distributed energy stores $C_{SM}$ depicted in FIG. 1. The submodules SM1, . . . , SM4 in the upper and lower valve branches P1 and N1 in this phase module $4_1$ illustrate a switching state distribution during normal operation of this converter 2. Of the four submodules SM1, . . . , SM4 in the upper valve branch P1, the submodules SM2 to SM4 are in the switching state I, and the submodule SM1 is in the switching state II. Of the submodules SM1, . . . , SM4 in the lower valve branch N1, the submodules SM1 to SM3 are in the switching state II, and the submodule SM4 is in the switching state I. The amplitude of the DC voltage $U_{dc}$ which is present at the DC voltage connections $P_0$ and $N_0$ of the converter 2 is therefore $U_{dc}=4 \cdot U_{SM}$. The voltage $u_{ZP}$ in the upper valve branch P1 with respect to a virtual neutral point is given by $u_{ZP}=3 \cdot U_{SM}$, while, in contrast, the voltage $u_{ZN}$ in the lower valve branch N1 is given by $u_{ZN}=1 \cdot U_{SM}$.

Once a pulse inhibitor is triggered, all the submodules SM1 to SM4 in the upper and lower valve branches P1 and N1 are switched to the switching state III. The phase module $4_1$ with the submodules SM1 to SM4 in the switching state III is illustrated in FIG. 2b. The pulse inhibitor can be set on the one hand by a fault occurring (for example an overcurrent) by an open-loop and closed-loop control device, which is not illustrated in any more detail, in the converter 2, whereas on the other hand autonomously by the submodules SM1 to SM4 (disturbance with or breakdown of communication, overvoltage). Since the time at which a pulse inhibitor is set cannot be predicted, the voltages $u_{ZP}$ and $u_{ZN}$ and/or their rates of change $du_{ZP}/dt$ and $du_{ZN}/dt$ over the valve branches P1 and N1 in a phase module $4_1$ are governed solely by the direction of the corresponding branch current $i_{ZP1}$ and $i_{ZN1}$ when the pulse inhibitor is set.

On the assumption that the sum of the two branch voltages $u_{ZP}$ and $u_{ZN}$ in a respective phase $4_1$, $4_2$ or $4_3$ corresponds on average to the DC voltage $U_{dc}$ during normal operation, this results in the voltages and voltage changes as shown in the following table after a pulse inhibitor has been set.

| Direction of the branch currents $i_{ZP}/i_{ZN}$ | pos/pos | pos/neg | neg/pos | neg/neg |
|---|---|---|---|---|
| $u_{ZP}$ | $U_{dc}$ | $U_{dc}$ | 0 | 0 |
| $u_{ZN}$ | $U_{dc}$ | 0 | $U_{dc}$ | 0 |
| $u_{ZP} + u_{ZN}$ | $2 U_{dc}$ | $U_{dc}$ | $U_{dc}$ | 0 |
| $\Delta(u_{ZP} + u_{ZN})$ * | $+U_{dc}$ | 0 | 0 | $-U_{dc}$ |

* Assumption: mean sum of the branch voltages before the pulse inhibitor ($u_{ZP} + u_{ZN}$) = $U_{dc}$ It is also assumed that the capacitor voltages $U_{SM}$ in each submodule SM on average have a value of $U_{SM}=U_{dc}/n_{sub}$, where $n_{sub}$ represents the number of series-connected submodules SM1, . . . , SMn in each valve branch P1, N1, P2, N2, P3 and N3 in the converter 2 with distributed energy stores $C_{SM}$.

As can be seen from this table, two worst-case scenarios occur with respect to the voltage change in the branches in one phase when a pulse inhibitor is set. The maximum voltage change in the sum of the branch voltages $u_{ZP}$ and $u_{ZN}$ in a phase module $4_1$, $4_2$ and $4_3$ is $\pm U_{dc}$ and occurs when both branch currents $i_{ZP}$ and $i_{ZN}$ in a phase module 4 have the same mathematical sign. This state is maintained until one of the branch currents has been commutated down to zero.

Switching on the switching state III results in commutation processes from the semiconductor switch S1 which can be turned off to a diode D2 in said submodules SM2, SM3, SM4 in the upper valve branch P1 and the submodule SM4 in the lower valve branch N1 in the phase module $4_1$, if, before setting of the pulse inhibitor, the sum of the branch voltages $u_{ZP}$ and $u_{ZN}$ in a phase module $4_1$ is on average equal to the DC voltage $U_{dc}$ between the DC voltage connections $P_0$ and $N_0$, and the branch currents $i_{ZP}$ and $i_{ZN}$ have a negative mathematical sign. When the switching state III is switched on, no commutation processes occur in the submodule SM1 in the upper valve branch P1 and the submodules SM1, SM2, SM3 in the lower valve branch N1 in the phase module $4_1$ if, before the setting of the pulse inhibitor, the sum of the branch voltages $u_{ZP}$ and $u_{ZN}$ in a phase module $4_1$ is on average equal to the DC voltage $U_{dc}$ and the branch currents $i_{ZP}$ and $i_{ZN}$ have a negative mathematical sign since the diode D2 carried the corresponding branch current before switching on the switching state III.

In contrast, commutation processes take place from the semiconductor switch S2 which can be turned off to the diode D1 in said submodules as a result of switching on the switching state III in the submodule SM1 in the upper valve branch P1 and the submodules SM1, SM2, SM3 in the lower valve branch N1 in the phase module $4_1$ if, before setting of the pulse inhibitor, the sum of the branch voltages $u_{ZP}$ and $u_{ZN}$ of a phase module $4_1$ is on average equal to the DC voltage $U_{dc}$ between the DC voltage connections $P_o$ and $N_o$, and the branch currents $i_{ZP}$ and $i_{ZN}$ have a positive mathematical sign. No commutation processes take place when the switching state III is switched on in the submodules SM2, SM3, SM4 in the upper valve branch P1 and the submodule SM4 in the lower valve branch N1 in the phase module $4_1$ if, before setting of a pulse inhibitor, the sum of the branch voltages $u_{ZP}$ and $U_{ZN}$ of a phase module $4_1$ is on average equal to the DC voltage $U_{dc}$ and the branch currents $i_{ZP}$ and $i_{ZN}$ have a negative mathematical sign, since the diode D1 carried the corresponding branch current before switching on the switching state III.

A voltage rate of change which, for example, may be 4 kV/μs can be assumed for a semiconductor switch S1 or S2 which can be turned off in each submodule SM, for every voltage change which occurs during a commutation process. This then results in a voltage rate of change across the two valve branches P1 and N1 in the phase module $4_1$ with a value of 16 kV/μs, because there are four submodules SM in the phase module $4_1$ in the switching state I before the setting of a pulse inhibitor. The greater the number of submodules SM which are used in each valve branch P1, N1, P2, N2, P3 and N3 in the converter 3 with distributed energy stores $C_{SM}$, the higher is the value of the voltage change per phase module $4_1$, $4_2$ and $4_3$.

In order to obtain a respective output voltage $u_{L10}$, $U_{L20}$, $U_{L30}$ with as sinusoidal a waveform as possible at the respective output L1, L2 or L3 of a respective phase module $4_1$, $4_2$ or $4_3$ in the converter 2 with distributed energy stores $C_{SM}$, twelve or more submodules SM, for example, are used for each valve branch P1, N1, P2, N2, P3 and N3. When there are twelve submodules SM for each valve branch P1, N1, P2, N2, P3 and N3, the voltage rate of change is already 48 kV/μs.

If the DC voltage $U_{dc}$ which is present at the DC voltage connections $P_0$ and $N_0$ of the converter 2 with distributed energy stores $C_{SM}$ is assumed to be constant, then said voltage rate of change acts not only on a branch inductor $L_Z$ but also on a parasitic inductor $L_{dc}$ in the DC voltage circuit. This voltage load on the branch inductor $L_Z$ leads to a large physical size, because of the use of reinforced insulation.

With respect to the output voltages $u_{L10}$, $u_{L20}$ and $u_{L30}$ of the converter 2 with distributed energy stores $C_{SM}$, different worst-case conditions occur in comparison to the converter-internal voltages $u_{ZP}$ and $u_{ZN}$. A worst-case situation will be explained below with reference to FIGS. 3a and 3b, with respect to the voltage changes in the phase voltages $u_{L10}$ in the phase module $4_1$ in the converter 2 as shown in FIG. 1.

Because of the switching state distribution of the submodules SM1 to SM4 in the valve branches P1 and N1 in the phase module $4_1$ in the converter 2 with distributed energy stores $C_{SM}$ as shown in FIG. 1, the submodules SM1 to SM4 in the upper valve branch P1 are all in switching state II. In contrast, the submodules SM1 to SM4 in the lower valve branch N1 are all in the switching state I. The phase voltage $u_{L10}$, which is equal to half the difference between the valve voltages $u_{ZN}$ and $u_{ZP}$, is $U_{dc}/2$. If a pulse inhibitor is now set, then this results in a voltage change in the phase voltage $U_{L10}$ which is dependent on the instantaneous current direction of the branch currents $i_{ZP}$ and $i_{ZN}$. The following table provides an overview of the voltages and voltage changes over the valve branches P and N in a phase module 4 after a pulse inhibitor has been set.

| Pulse inhibitor | Direction of the branch currents $i_{ZP}/i_{ZN}$ | pos/pos | pos/neg | neg/pos | neg/neg |
|---|---|---|---|---|---|
| Before | $u_{ZP}$ | 0 | 0 | 0 | 0 |
|  | $u_{ZN}$ | $U_{dc}$ | $U_{dc}$ | $U_{dc}$ | $U_{dc}$ |
|  | $u_{L10}$ | $U_{dc}/2$ | $U_{dc}/2$ | $U_{dc}/2$ | $U_{dc}/2$ |
| After | $u_{ZP}$ | $U_{dc}$ | $U_{dc}$ | 0 | 0 |
|  | $u_{ZN}$ | $U_{dc}$ | 0 | $U_{dc}$ | 0 |
|  | $u_{L10}$ | 0 | $-U_{dc}/2$ | $U_{dc}/2$ | 0 |
|  | $\Delta u_{L10}$ | $-U_{dc}/2$ | $-U_{dc}$ | 0 | $-U_{dc}/2$ |
|  | $\Delta(u_{ZP} + u_{ZN})$ * | $U_{dc}$ | 0 | 0 | $-U_{dc}$ |

* Assumption: Capacitor voltage of a submodule $U_{SM,x} = U_{dc}/n_{sub}$

The worst-case situation with respect to the voltage change in the phase voltage $U_{L10}$, $u_{L20}$ or $U_{L30}$ after setting a pulse inhibitor occurs when the following conditions occur before setting of the pulse inhibitor:
- all the submodules in a valve branch, for example in the valve branch N1, in a phase module are in the switching state I
- all the submodules in a corresponding valve branch, for example the valve branch P1, in a phase module are in switching state II
- the branch current, for example the branch current $i_{ZN}$, in the valve branch with the submodules which are in switching state I has a negative mathematical sign, and
- the branch current, for example the branch current $i_{ZP}$, in the valve branch with the submodules which are in switching state II has a positive mathematical sign.

In these conditions, the phase voltage $u_{L10}$ jumps from $U_{dc}/2$ to $-U_{dc}/2$, or from $-U_{dc}/2$ to $U/dc/2$. In these conditions, the change in the phase voltage $u_{L10}$ is therefore $\pm U_{dc}$. If it is now assumed that a voltage rate of change of, for example, 4 kV/μs occurs across each submodule SM in the phase module $4_1$ in each submodule SM1 to SM4 in each valve branch P1 and N1 in a phase module $4_1$, because of the commutation from a semiconductor switch S1 or S2 which can be turned off to a respective diode D2 or D1 then this results in a value of 16 kV/μs for the voltage rate of change of the phase voltage $u_{L10}/dt$, $u_{L20}/dt$ and $u_{L30}/dt$ when there are four submodules SM in each valve branch P and N, and in a value of 48 kV/μs when there are twelve submodules SM in each valve branch P and N in a phase module $4_1$.

This means in the worst-case situation, in which two phase voltages change suddenly through $\pm U_{dc}$ in opposite senses, for a line voltage $u_{L1L2}$, that a voltage change of $\Delta u_{L1L2} = \pm 2U_{dc}$ and a voltage rate of change of 32 kV/μs occurs across an output impedance (stator winding of a connected polyphase motor 6) when four submodules SM are used in each valve branch P and N in a phase module $4_1$, or of 96 kV/μs when twelve submodules SM are used in each valve branch P and N in a phase module $4_1$. In order to prevent a DC voltage feeder on the power supply system side and a polyphase motor 6 connected on the load side from being excessively damaged when worst-case situations occur, these components must be designed for a very much greater voltage rate of change, thus resulting in additional costs to a not inconsiderable level.

It would therefore be desirable and advantageous to obviate prior art shortcomings and to provide an improved method for inhibiting a converter with distributed energy stores, in which the voltage load in worst-case situations is significantly reduced.

SUMMARY OF THE INVENTION

According to one aspect of the present invention, a method for inhibiting a converter having at least two phase modules, which each phase module having an upper and a lower valve branch, with each upper and lower valve branch having a plurality of two-pole submodules, which are electrically connected in series and each have a unipolar energy storage capacitor, with a series connection of two turn-off semiconductor switches each being connected in parallel with an antiparallel connected diode, includes the steps of a) triggering a pulse inhibitor in response to a fault occurring during operation of the converter, b) controlling a switching state of one two-pole submodule in each valve branch to a switching state III after a pulse inhibitor has been set, c) controlling an additional submodule in each valve branch to a switching state III after a predetermined time interval has elapsed, and d) repeating step c) until all two-pole submodules in each valve branch are controlled to the switching state III.

According to an advantageous feature of the present invention, controlling the switching state of an additional submodule includes controlling either an outer additional submodule or an inner additional submodule in an upper and a lower valve branch in each phase module.

According to another advantageous feature of the present invention, the predetermined time interval is equal to a turn-off delay time of a turn-off semiconductor switch in a two-pole submodule.

According to another advantageous feature of the present invention, the two turn-off semiconductor switches of a two-pole submodule are switched off when the two-pole submodule is in the switching state III.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 3a, 3b show switching state distributions in the submodules in a phase module in the converter as shown in FIG. 1 before and after setting a pulse inhibitor, and FIGS. 4a to 4e each show switching state distributions in the submodules in a phase module in the converter as shown in FIG. 1, which result by means of the method according to the invention.

DETAILED DESCRIPTION OF PREFERRED EMBODIMENTS

Figure 1:
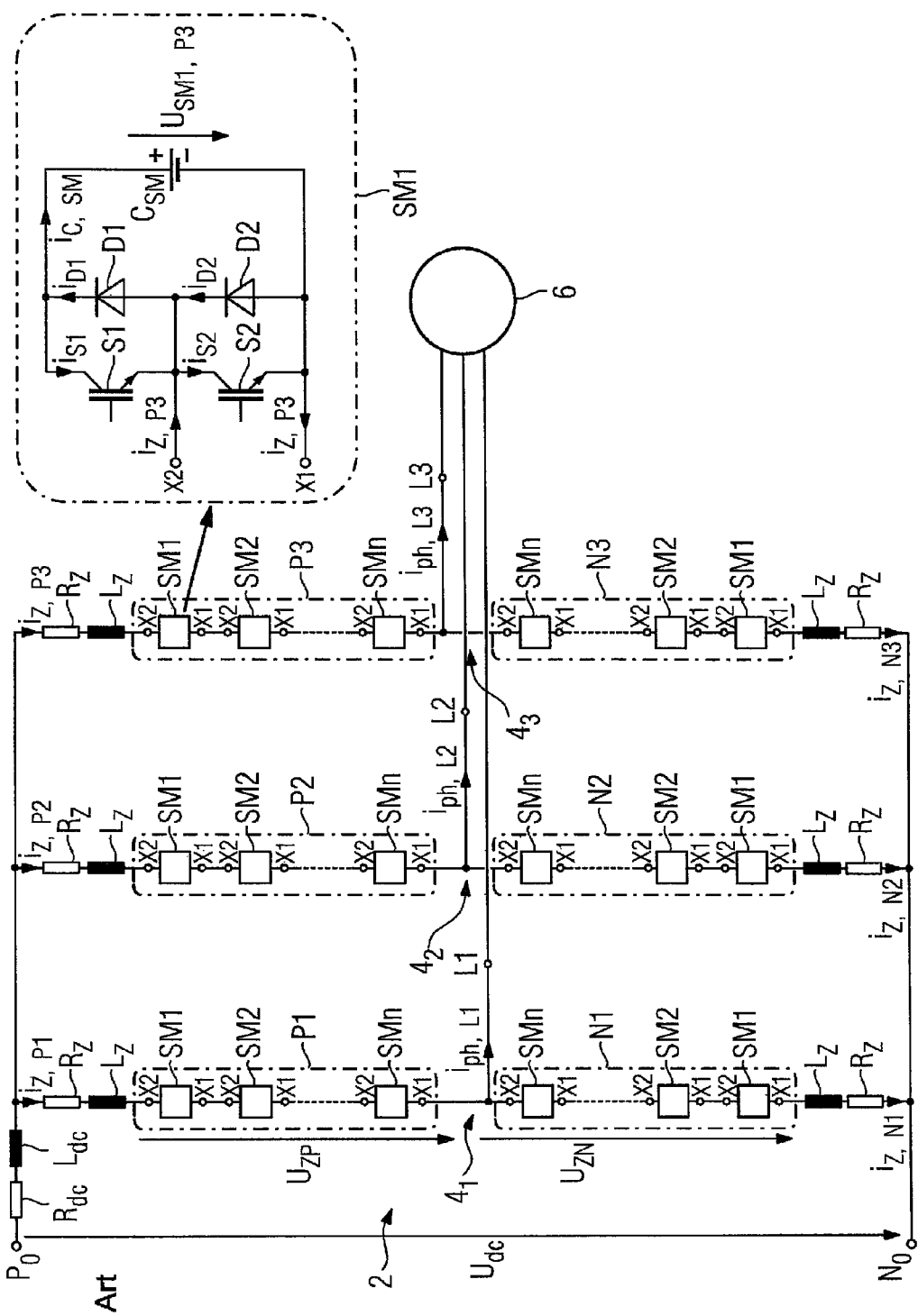
FIG. 1 shows an equivalent circuit of a conventional converter with distributed energy stores.
Figures 2A, 2B:
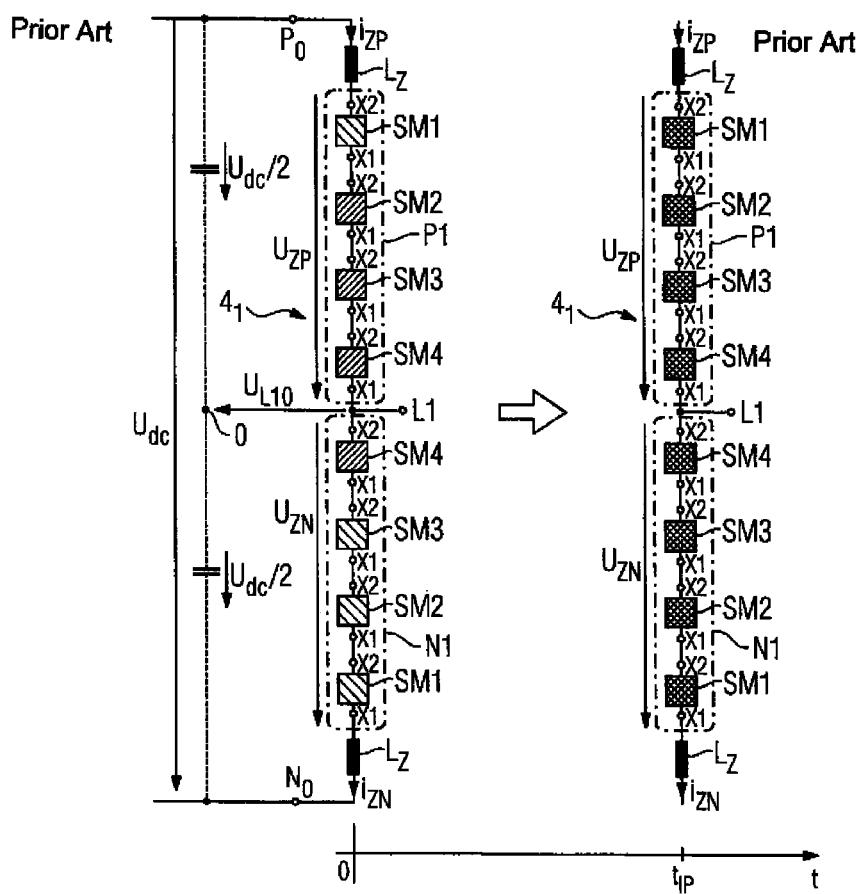
FIGS. 2a, 2b show switching state distributions in the submodules in a phase module in the converter as shown in FIG. 1, before and after setting a pulse inhibitor.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The method according to the invention for inhibiting a converter 2 with distributed energy stores $C_{SM}$ as shown in FIG. 1 will now be explained in more detail with reference to FIGS. 4a to 4e. According to the method according to the invention, after a pulse inhibitor has been set, the submodules SM1 to SM4 in an upper and lower valve branch P1 and N1 in each phase module $4_1$, $4_2$ and $4_3$ in the converter 2 are no longer controlled at the same time to the switching state III, but staggered in time. This time staggering of the processing of a pulse inhibitor which has been set is illustrated by four switching state distributions of the submodules SM1 to SM4 in the valve branches P1 and N1 in the phase module $4_1$, with the arrows between two respective switching state distributions in the phase module $4_1$ as shown in FIGS. 4b to 4e each symbolizing a predetermined time interval Δt for the time-staggered or stepped implementation of the processing of a pulse inhibitor which has been set.

FIG. 4a illustrates the phase module $4_1$ in the converter 2 as shown in FIG. 1 with a random switching state distribution of the submodules SM1 to SM4 in its upper and lower valve branches P1 and N1. Of the submodules SM1 to SM4 in the valve branches P1 and N1 in the phase module $4_1$, the submodules SM1 and SM2 are each in the switching state II while, in contrast, the submodules SM3 and SM4 are each in the switching state I. If a pulse inhibitor is now set, then, in a first step at the time t1 (FIG. 4b), one submodule SM1 in the upper and lower valve branches P1 and N1 is in each case controlled to the switching state III. After a predetermined time interval Δt has elapsed, that is to say at the time t2 (FIG. 4c), a further submodule SM2 in the upper and lower valve branches P1 and N1 in the phase module $4_1$ is in each case controlled to the switching state III. After a predetermined time interval Δt has elapsed, specifically at the time t3 (FIG. 4d), a further submodule SM3 in the upper and lower valve branches P1 and N1 in this phase module $4_1$ is in each case controlled to the switching state III. After a further time interval Δt has elapsed, at the time t4 (FIG. 4e), a further submodule SM4 in the upper and lower valve branches P1 and N1 in this phase module $4_1$ is controlled to the switching state III. At the time t4, all the submodules SM1 to SM4 in each valve branch P1, N1, P2, N2, P3 and N3 in the converter 2 with distributed energy stores $C_{SM}$ are therefore in the switching state III, with a pulse inhibitor which has been set being implemented in a staggered form, according to the invention.

There is a predetermined time interval Δt in each case as the time stagger between the individual method steps (FIGS. 4b to 4e), and this preferably corresponds to a so-called "delay time" of a semiconductor switch S1 or S2 which can be turned off in a submodule SM. This delay time of a semiconductor switch S1 or S2 which can be turned off in a submodule SM is the minimum time interval Δt which can be implemented. After a minimum time interval Δt has in each case elapsed, a switching state change of a submodule SM is complete. This ensures that the voltage load in each time step of the stepped processing of a pulse inhibitor which has been set corresponds at most only to the voltage rate of change of two submodules SM.

For example, if the voltage rate of change in each submodule SM is 4 kV/μs, the maximum du/dt load during each switching state change is only 8 kV/μs in comparison to 16 kV/μs when a pulse inhibitor is processed in the conventional manner. This means that the method according to the invention at least halves the voltage load for converter-internal voltages and phase output voltages.

When a pulse inhibitor which has been set is processed staggered in time according to the invention, there is no need to control in each case one submodule SM in an upper and a lower valve branch to the switching state III at the same time, while, instead it is also possible to control only one submodule SM in each phase module $4_1$, $4_2$ and $4_3$ to the switching state III. It is irrelevant which of the submodules SM in a phase module $4_1$, $4_2$ and $4_3$ is started with. The sequence on the basis of which the submodules SM in an upper and a lower valve branch P1, N1, P2, N2, P3 and N3 and a phase module $4_1$, $4_2$ and $4_3$ are controlled to the switching state III is also irrelevant for the reduction in the du/dt load.

It is important to provide a time offset between the switching state changes of in each case one submodule SM in an upper and a lower valve branch P1, N1, P2, N2, P3 and N3 and a phase module $4_1$, $4_2$ and $4_3$.

If only one submodule SM in a phase module $4_1$, $4_2$ and $4_3$ in the converter 2 with distributed energy stores $C_{SM}$ as shown in FIG. 1 is in each case controlled to the switching state III when a pulse inhibitor which has been set is processed staggered in time, twice as many time steps are required instead of the four time steps shown in FIG. 4, that is to say eight time steps are required, before a pulse inhibitor which has been set has been implemented. Considerably more time is accordingly required to implement a pulse inhibitor which has been set. If there are twelve or more submodules in each valve branch P1, N1, P2, N2, P3 and N3 in the converter 2 as shown in FIG. 1, it is necessary to check, depending on the application of the converter, whether the protection functions which are initialized with the pulse inhibitor can be satisfied.

The pulse inhibitor is set in order to turn off the converter 2 with distributed energy stores $C_{SM}$ in critical operating states, for example overcurrent, overvoltage or failure of the drive, such that the converter 2 is in a safe state after the pulse inhibitor has been applied. The time available for turning off the converter 2 is not unlimited, because of these fault situations.

The method according to the invention is therefore used, wherein two submodules, specifically one submodule in the upper valve branch P1, P2, P3 and one submodule SM in the lower valve branch N1, N2, N3, are controlled to the switching state III at the same time in each time stagger.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for inhibiting a converter having at least two phase modules, which each phase module having an upper and a lower valve branch, with each upper and lower valve branch having a plurality of two-pole submodules, which are electrically connected in series and each have a unipolar energy storage capacitor, with a series connection of two turn-off semiconductor switches each being connected in parallel with an antiparallel connected diode, the method comprising the steps of:
   a) triggering a pulse inhibitor in response to a fault occurring during operation of the converter,
   b) controlling a switching state of exactly one two-pole submodule in each valve branch to a switching state III after a pulse inhibitor has been set, wherein in the switching state III all semiconductor switches of a corresponding two-pole submodule are in an off state,
   c) controlling exactly one additional submodule in each valve branch to the switching state III after a predetermined time interval has elapsed, wherein at steps b) and c) all semiconductor switches of an identical number of submodules are in the switching state III, and
   d) repeating step c) until all two-pole submodules in each valve branch are controlled to the switching state III.

2. The method of claim 1, wherein the one two-pole submodule in each valve branch is a two-pole submodule of an upper and lower valve branch in each phase module connected to a DC connection, and repeating step c) includes sequentially controlling an additional two-pole submodule in each valve branch located inward from a previously controlled two-pole submodule toward an AC side connection.

3. The method of claim 1, wherein the one two-pole submodule in each valve branch is a two-pole submodule of an upper and lower valve branch in each phase module connected to an AC side connection, and repeating step c) includes sequentially controlling an additional two-pole submodule in each valve branch located outward from a previously controlled two-pole submodule toward, a DC connection.

4. The method of claim 1, wherein the predetermined time interval is equal to a turn-off delay time of a turn-off semiconductor switch in a two-pole submodule.

5. The method of claim 1, wherein in the switching state III of a two-pole submodule, the two turn-off semiconductor switches of the two-pole submodule are switched off.

* * * * *